United States Patent
Spangler et al.

(10) Patent No.: US 10,774,655 B2
(45) Date of Patent: Sep. 15, 2020

(54) GAS TURBINE ENGINE COMPONENT WITH FLOW SEPARATING RIB

(71) Applicant: United Technologies Corporation, Farmington, CT (US)

(72) Inventors: Brandon W. Spangler, Vernon, CT (US); Gina Cavallo, Watertown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 141 days.

(21) Appl. No.: 15/919,253

(22) Filed: Mar. 13, 2018

(65) Prior Publication Data

US 2018/0245472 A1 Aug. 30, 2018

Related U.S. Application Data

(63) Continuation-in-part of application No. 14/665,170, filed on Mar. 23, 2015, now abandoned.

(Continued)

(51) Int. Cl.
*F01D 5/18* (2006.01)
*F01D 9/04* (2006.01)
(Continued)

(52) U.S. Cl.
CPC ............ *F01D 5/187* (2013.01); *F01D 5/186* (2013.01); *F01D 9/041* (2013.01); *F01D 9/065* (2013.01);
(Continued)

(58) Field of Classification Search
CPC .. F01D 5/186; F01D 5/147; F01D 9/02; F01D 5/187; F01D 9/041; F01D 9/065; Y02T 50/676
See application file for complete search history.

(56) References Cited

U.S. PATENT DOCUMENTS 4,312,624 A 1/1982 Steinbauer, Jr. et al.
4,461,612 A 7/1984 Dodd
(Continued)

FOREIGN PATENT DOCUMENTS

| EP | 1626162 A1 | 2/2006 |
|---|---|---|
| GB | 2405451 A | 3/2005 |
| WO | 2014175937 | 10/2014 |

OTHER PUBLICATIONS

European Search Report for European Patent Application No. 19162491 completed Aug. 22, 2019.

*Primary Examiner* — Eldon T Brockman
(74) *Attorney, Agent, or Firm* — Carlson, Gaskey & Olds, P.C.

(57) ABSTRACT

A component for a gas turbine engine according to an example of the present disclosure includes, among other things, a wall that extends about a cooling cavity. The cooling cavity is a dual-fed cavity that is fed from at least two different locations. A rib separates the cooling cavity into a first portion and a second portion that is fluidly isolated from the first portion. The component is an airfoil. The first portion is fed with a first cooling fluid from a first coolant source, and the second portion is fed with a second, different cooling fluid from a second coolant source. The first and second coolant sources are separate and distinct from the component.

20 Claims, 7 Drawing Sheets

Related U.S. Application Data

(60) Provisional application No. 61/975,198, filed on Apr. 4, 2014.

(51) Int. Cl.
    *F01D 25/12* (2006.01)
    *F01D 9/06* (2006.01)

(52) U.S. Cl.
    CPC .......... *F01D 25/12* (2013.01); *F05D 2240/11* (2013.01); *F05D 2240/12* (2013.01); *F05D 2240/20* (2013.01); *F05D 2250/184* (2013.01); *F05D 2250/185* (2013.01); *F05D 2250/75* (2013.01); *F05D 2260/202* (2013.01); *F05D 2260/2212* (2013.01); *F05D 2260/22141* (2013.01)

(56) References Cited

U.S. PATENT DOCUMENTS

| | | | |
|---|---|---|---|
| 4,798,515 A * | 1/1989 | Hsia | F01D 5/18 |
| | | | 415/115 |
| 5,498,126 A * | 3/1996 | Pighetti | F01D 9/065 |
| | | | 415/115 |
| 5,711,650 A | 1/1998 | Tibbott et al. | |
| 5,993,150 A | 11/1999 | Liotta et al. | |
| 7,104,756 B2 | 9/2006 | Harding et al. | |
| 7,186,082 B2 * | 3/2007 | Mongillo, Jr. | F01D 5/187 |
| | | | 416/1 |
| 7,665,962 B1 | 2/2010 | Liang | |
| 7,713,027 B2 | 5/2010 | Cherolis et al. | |
| 7,806,658 B2 | 10/2010 | Liang et al. | |
| 7,921,654 B1 | 4/2011 | Liang | |
| 8,398,371 B1 | 3/2013 | Liang | |
| 8,535,006 B2 * | 9/2013 | Lee | F01D 5/187 |
| | | | 416/97 R |
| 8,562,286 B2 | 10/2013 | Gleiner et al. | |
| 8,628,298 B1 | 1/2014 | Liang | |
| 8,647,071 B2 | 2/2014 | Pons et al. | |
| 8,870,537 B2 | 10/2014 | Lee | |
| 9,523,283 B2 * | 12/2016 | Uechi | F01D 5/189 |
| 2005/0265836 A1 * | 12/2005 | Mongillo, Jr. | F01D 5/187 |
| | | | 416/1 |
| 2009/0067994 A1 | 3/2009 | Pietraszkiewicz | |
| 2010/0183427 A1 | 7/2010 | Liang | |
| 2012/0014808 A1 * | 1/2012 | Lee | F01D 5/187 |
| | | | 416/97 R |
| 2013/0230408 A1 | 9/2013 | Boyer | |
| 2013/0302167 A1 * | 11/2013 | Lee | F01D 5/187 |
| | | | 416/95 |
| 2013/0315725 A1 * | 11/2013 | Uechi | F01D 5/189 |
| | | | 415/208.1 |
| 2014/0271153 A1 | 9/2014 | Uskert et al. | |
| 2015/0285096 A1 * | 10/2015 | Spangler | F01D 9/02 |
| | | | 415/115 |
| 2016/0023275 A1 * | 1/2016 | Propheter-Hinckley | B22F 3/1055 |
| | | | 416/96 A |

\* cited by examiner

GAS TURBINE ENGINE COMPONENT WITH FLOW SEPARATING RIB

CROSS REFERENCE TO RELATED APPLICATION

This application is a continuation-in-part of U.S. application Ser. No. 14/665,170, filed on Mar. 23, 2015, which claims priority to U.S. Provisional Application No. 61/975,198, which was filed on Apr. 4, 2014.

STATEMENT REGARDING FEDERALLY SPONSORED RESEARCH OR DEVELOPMENT

This invention was made with government support under Contract No. FA8650-09-D-2923-0021 awarded by the United States Air Force. The Government therefore has certain rights in this invention.

BACKGROUND

This disclosure relates to a gas turbine engine, and more particularly to a gas turbine engine component having an internal cooling circuit. The internal cooling circuit may include a cooling cavity and a rib that separates the cooling cavity into separate portions.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Because they are commonly exposed to hot combustion gases, many gas turbine engine components employ internal cooling circuits that channel a dedicated cooling fluid for cooling regions of the component. Thermal energy is transferred from the component to the cooling fluid to cool the component.

SUMMARY

A component for a gas turbine engine according to an example of the present disclosure includes a wall that extends about a cooling cavity. The cooling cavity is a dual-fed cavity that is fed from at least two different locations. A rib separates the cooling cavity into a first portion and a second portion that is fluidly isolated from the first portion. The component is an airfoil. The first portion is fed with a first cooling fluid from a first coolant source, and the second portion is fed with a second, different cooling fluid from a second coolant source. The first and second coolant sources are separate and distinct from the component.

In a further non-limiting embodiment of any of the foregoing embodiments, the first and second coolant sources are stages of a compressor section or a turbine section.

In a further non-limiting embodiment of any of the foregoing embodiments, the wall circumscribes the cooling cavity.

In a further non-limiting embodiment of any of the foregoing embodiments, the rib is offset from a midspan of the airfoil.

In a further non-limiting embodiment of any of the foregoing embodiments, the rib is defined at a location between 10% and 90% span or between 30% and 70% span of the airfoil.

A further non-limiting embodiment of any further embodiments includes a plurality of cooling features defined along the wall.

In a further non-limiting embodiment of any of the foregoing embodiments, the plurality of cooling features include pedestals that extend between opposed surfaces of the cooling cavity.

In a further non-limiting embodiment of any of the foregoing embodiments, the plurality of cooling features include trip strips that protrude from surfaces of the cooling cavity.

In a further non-limiting embodiment of any of the foregoing embodiments, the rib is skewed in a radial direction towards one of an inner diameter and an outer diameter of the airfoil.

In a further non-limiting embodiment of any of the foregoing embodiments, the first portion is an outer diameter portion and the second portion is an inner diameter portion of the cooling cavity.

In a further non-limiting embodiment of any of the foregoing embodiments, the outer diameter portion defines a first serpentine passage and the inner diameter portion defines a second serpentine passage. The first and second serpentine passages are bounded by the rib.

In a further non-limiting embodiment of any of the foregoing embodiments, the rib is spaced apart from leading and trailing edges of the airfoil.

In a further non-limiting embodiment of any of the foregoing embodiments, the rib extends between leading and trailing edges of the airfoil.

In a further non-limiting embodiment of any of the foregoing embodiments, the first portion is circumferentially offset from the second portion.

In a further non-limiting embodiment of any of the foregoing embodiments, the rib connects between opposing sides of the wall.

In a further non-limiting embodiment of any of the foregoing embodiments, the rib extends in an axial direction inside of the cooling cavity.

A further non-limiting embodiment of any further embodiments includes a plurality of openings through portions of the wall associated with both the first portion and the second portion, wherein the plurality of openings are film cooling holes.

A gas turbine engine according to an example of the present disclosure includes a component that defines a cooling circuit that cools the component with a cooling fluid. The cooling circuit is disposed inside an airfoil of the component. The cooling circuit has a cooling cavity disposed inside of the component, and an axial rib that divides the cooling cavity into a first portion and a second portion that is separate from the first portion. The first portion is fed with a first cooling fluid from a first coolant source, and the second portion is fed with a second, different cooling fluid from a second coolant source. The first and second coolant sources are separate and distinct from the component.

In a further non-limiting embodiment of any of the foregoing embodiments, the rib fluidly isolates the first portion from the second portion.

In further non-limiting embodiment of any further embodiments, a mid-turbine frame includes the airfoil.

A component according to an exemplary aspect of the present disclosure includes, among other things, a wall that extends about a cooling cavity. The cooling cavity is a dual-fed cavity that is fed from at least two different locations. A rib separates the cooling cavity into a first portion and a second portion that is fluidly isolated from the first portion.

In a further non-limiting embodiment of the foregoing component, the component is one of a vane, a blade, a blade outer air seal (BOAS), and a liner.

In a further non-limiting embodiment of either of the foregoing components, the wall circumscribes the cooling cavity.

In a further non-limiting embodiment of any of the foregoing components, the first portion of the cooling cavity is fed with a first cooling fluid and the second portion of the cooling cavity is fed with a second, different cooling fluid.

In a further non-limiting embodiment of any of the foregoing components, the first portion is an outer diameter portion and the second portion is an inner diameter portion of the cooling cavity.

In a further non-limiting embodiment of any of the foregoing components, the first portion is circumferentially offset from the second portion.

In a further non-limiting embodiment of any of the foregoing components, the rib connects between opposing sides of the wall.

In a further non-limiting embodiment of any of the foregoing components, the rib extends in an axial direction inside of the cooling cavity.

In a further non-limiting embodiment of any of the foregoing components, the components include a plurality of openings through portions of the wall associated with both the first portion and the second portion.

In a further non-limiting embodiment of any of the foregoing components, the plurality of openings are film cooling holes.

A gas turbine engine according to another exemplary aspect of the present disclosure includes, among other things, a component that defines a cooling circuit configured to cool the component with a cooling fluid. The cooling circuit includes a cooling cavity disposed inside of the component and an axial rib that divides the cooling cavity into a first portion and a second portion that is separate from the first portion.

In a further non-limiting embodiment of the foregoing gas turbine engine, the rib fluidly isolates the first portion from the second portion.

In a further non-limiting embodiment of either of the foregoing gas turbine engines, the cooling circuit is disposed inside an airfoil of the component.

In a further non-limiting embodiment of any of the foregoing gas turbine engines, the cooling circuit is disposed inside of a body of the component.

In a further non-limiting embodiment of any of the foregoing gas turbine engines, the cooling circuit includes a plurality of openings that expel the cooling fluid from both the first portion and the second portion.

A method of cooling a gas turbine engine component according to another exemplary aspect of the present disclosure includes, among other things, dividing a cooling cavity disposed inside the gas turbine engine component into a first portion and a second portion with a rib, communicating a first cooling fluid from a first location into the first portion, and communicating a second cooling fluid from a second location into the second portion.

In a further non-limiting embodiment of the foregoing method, the method includes expelling the first and second cooling fluids from the cooling cavity through a plurality of openings.

In a further non-limiting embodiment of either of the foregoing methods, the second cooling fluid is separate from the first cooling fluid.

In a further non-limiting embodiment of any of the foregoing methods, the rib fluidly isolates the first portion from the second portion.

In a further non-limiting embodiment of any of the foregoing methods, one of the first portion and the second portion of the cooling cavity is positioned in a high pressure area and the other of the first portion and the second portions is positioned in a low pressure area.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a gas turbine engine component that includes an internal cooling circuit. The cooling circuit employs one or more cooling cavities disposed inside of the component. A flow separating rib is positioned to divide the cooling cavity into at least two portions. The cooling cavity may be fed with separate cooling fluids at opposite sides of the cavity. These opposite fluid flows are fluidly isolated between the first portion and the second portion by the rib in order to maintain a constant fluid flow within each portion even where pressure differentials may exist between the opposite sides. A more evenly cooled part is achieved by maintaining constant fluid flows within each portion of the cooling cavity. These and other features are discussed in greater detail herein.

Figure 1:
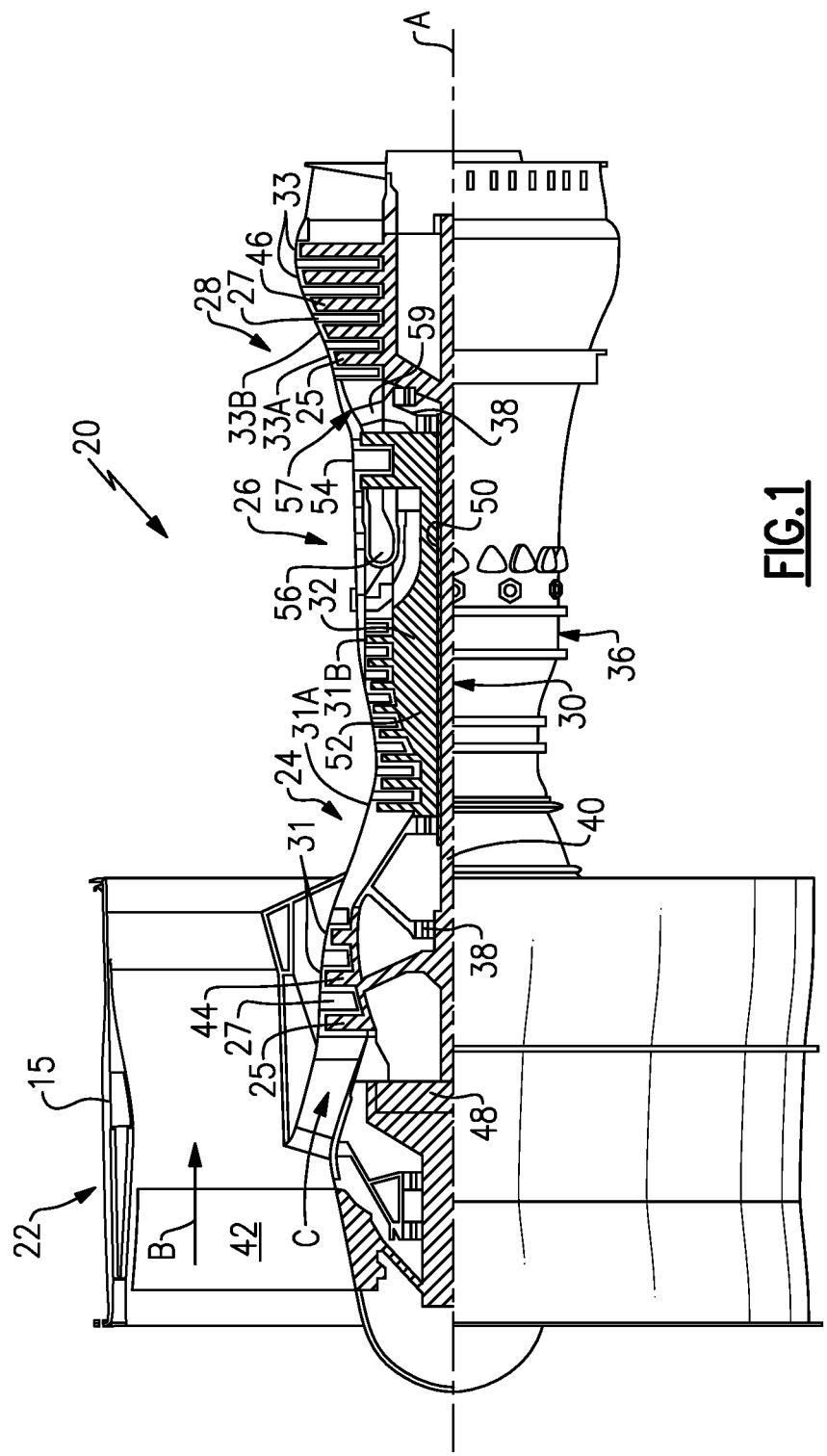
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of the bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via the bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans and turboshafts.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1,150 ft/second (350.5 meters/second).

Each of the compressor section 24 and the turbine section 28 may include alternating rows of rotor assemblies and vane assemblies (shown schematically) that define a plurality of stages 31 of the compressor section 24 and a plurality of stages 33 of the turbine section 28. For example, the rotor assemblies can carry a plurality of rotating blades 25, while each vane assembly can carry a plurality of vanes 27 that extend into the core flow path C. The blades 25 may either create or extract energy in the form of pressure from the core airflow as it is communicated along the core flow path C. The vanes 27 direct the core airflow to the blades 25 to either add or extract energy.

Figure 2:
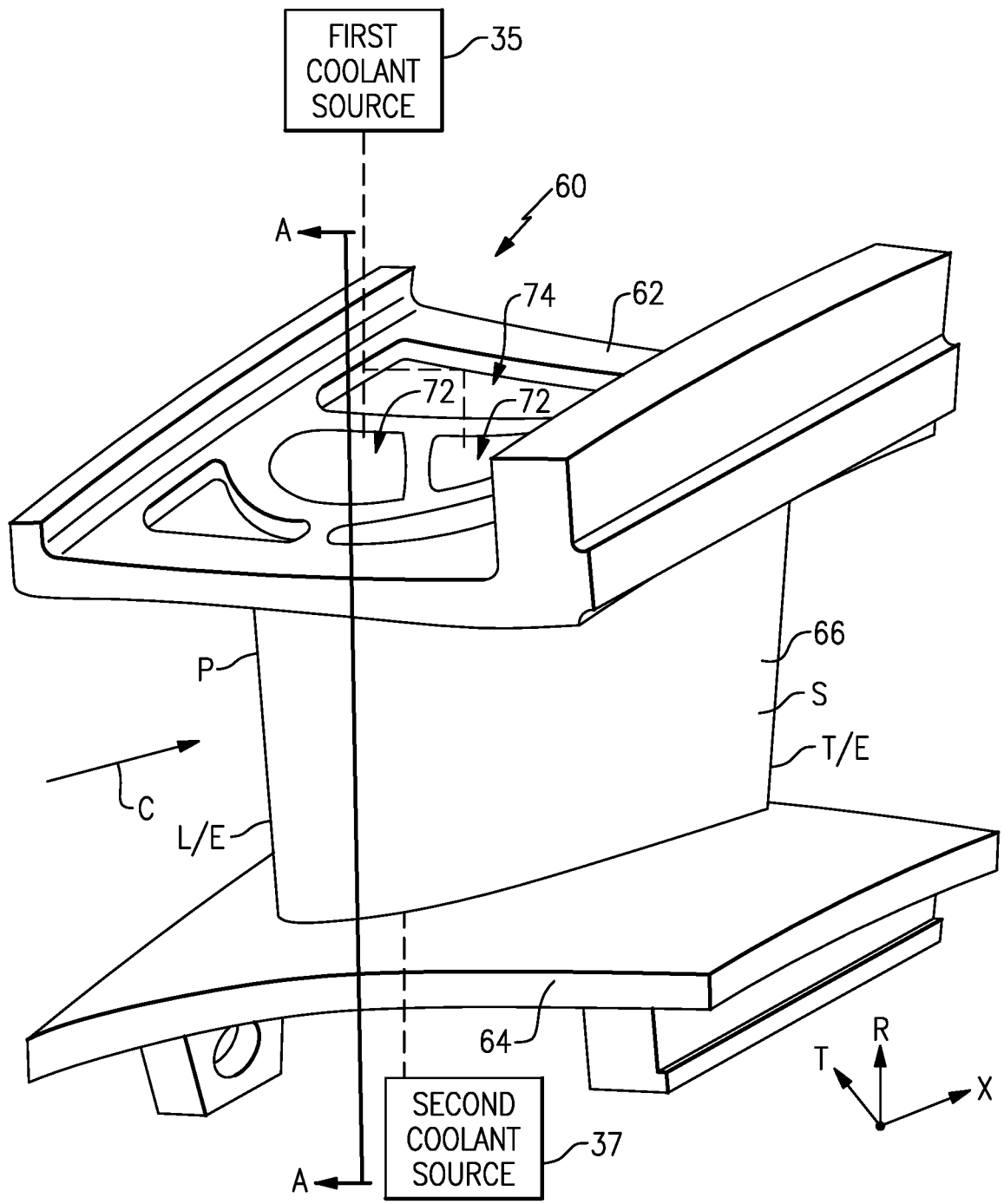
FIG. 2 illustrates a gas turbine engine component according to a first embodiment of this disclosure.

FIG. 2 illustrates a component 60 that can be incorporated into a gas turbine engine, such as one or more airfoils including blades 25, vanes 27 or airfoils 59 of the gas turbine engine 20 of FIG. 1. In this non-limiting embodiment, the component 60 is represented as a turbine vane, which can be utilized in a stage 33 of the high pressure turbine 54 or low pressure turbine 46, for example. However, the teachings of this disclosure are not limited to turbine vanes and could extend to other components of a gas turbine engine, including but not limited to, other vanes, blades, blade outer air seals (BOAS) (see, for example, the BOAS illustrated in FIG. 6), or other components such as a blade or vane of the compressor section 24.

In one embodiment, the component 60 includes an outer platform 62, an inner platform 64, and an airfoil 66 that extends in a chordwise direction X between leading and trailing edges L/E, T/E, in a radial direction R between the outer platform 62 and the inner platform 64, and in a thickness direction T between pressure and suction sides P, S. The thickness direction T is generally perpendicular to the chordwise and radial directions X, R. The outer platform 62 connects the component 60 to an engine casing (not shown) and the inner platform 64 affixes a radially inboard portion of the component 60 to securely position the component 60 within the core flow path C.

The component 60 can include one or more internal cooling cavities 72 that are disposed inside of the component 60. In one embodiment, the cooling cavities 72 extend inside of the airfoil 66 of the component 60. In another embodiment, one or more cooling cavities may extend inside a body or platform portion of the component, such as in components that do not have an airfoil (e.g., a BOAS, liner, panel, etc.).

The internal cooling cavities 72 define a cooling circuit 74 for cooling the component 60. The illustrated cooling circuit 74 represents but one non-limiting example of many potential cooling circuits. In other words, the component 60 could be manufactured to include various alternatively shaped and sized cooling passages as part of an internal circuitry within the scope of this disclosure.

Figure 3:
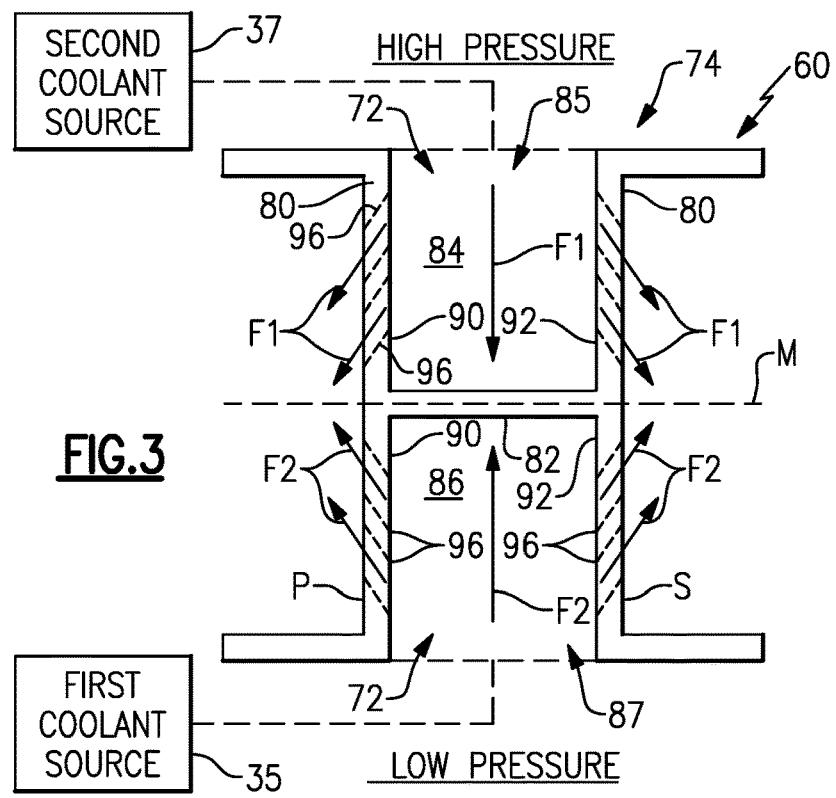
FIG. 3 illustrates a cross-sectional view through Section A-A of FIG. 2.

FIG. 3 illustrates a portion of the cooling circuit 74 described in FIG. 2. In this embodiment, a cross-section through a cooling cavity 72 is depicted. The cooling cavity 72 is generally surrounded or circumscribed by a wall 80. Opposing sides 90, 92 of the wall 80 define flow boundaries of the cooling cavity 72. The wall 80 may embody any of a variety of sizes and shapes within the scope of this disclosure.

A rib 82 may axially extend inside of the cooling cavity 72 to separate the cooling cavity 72 into a first portion 84 and a second portion 86. In one embodiment, the first portion 84 is an outer diameter portion of the cooling cavity 72 and the second portion 86 is an inner diameter portion. However, other configurations are also contemplated as being within the scope of this disclosure, including but not limited to circumferentially spaced portions such that the first portion 84 is circumferentially offset from the second portion 86 (see, e.g., FIG. 6) and axially spaced portions (see, e.g., FIG. 7).

Rib 82 can be defined at various span positions of the airfoil 66 relative to the radial direction R. Span position may be relative to the inner platform 64, such as 0% span at the inner platform 64 and 100% span at outer platform 62 (or a tip of blade 25). In an embodiment, rib 82 is defined at about 50% span (i.e., mid-span position). In other embodiments, rib 82 is defined at a location between 10-90% span, or more narrowly between 30-70% span such that rib 82 is radially offset from the mid-span position. The rib 82 can be situated relatively closer to one of the platforms 62, 64 to vary the relative sizes of the first and second portions 84, 86 of the cooling cavity 72.

In one embodiment, the rib 82 extends between the opposing sides 90, 92 of the wall 80 to completely seal and separate the first portion 84 of the cooling cavity 72 from the second portion 86 of the cooling cavity 72. Said another way, the rib 82 is a solid flow separator that fluidly isolates the first portion 84 from the second portion 86 of the cooling cavity 72.

The rib 82 may be positioned at a mid-span M of the cooling cavity 72. The actual location of the rib 82 could vary part-by-part and may depend on pressure differentials that exist between the first portion 84 and the second portion 86 of the cooling cavity 72, among other factors.

In one embodiment, the cooling cavity 72 is a dual-fed cavity that is fed with a cooling fluid at both of its opposite sides (i.e., fed from two distinct locations). In embodiments, the first and second portions 84, 86 of the cooling cavity 72 are fed from distinct first and second coolant sources 35, 37 that communicate coolant from different locations. The first and second coolant sources 35, 37 are separate and distinct from the component 60. For example, the first portion 84 of the cooling cavity 72 may be fed with a first cooling fluid F1 from the first coolant source 35, such as a first bleed airflow from a first stage 31A of the compressor section 24 (FIG. 1), and the second portion 86 of the cooling cavity 72 may be fed with a second cooling fluid F2 from the second coolant source 37, such as a second bleed airflow from a second, different stage 31B of the compressor section 24 (FIG. 1). In other words, the cooling fluids F1 and F2 may be separate from one another.

The first and second coolant sources 35, 37 can be defined by various locations or components of the engine 20. In embodiments, one of the first and second bleed airflows is supplied by a first stage 31A of the compressor section 24, and another one of the first and second bleed airflows is supplied by a second stage 31B of the compressor section 24. In some embodiments, the first stage 31A is an upstream stage of high pressure compressor 52 that supplies the cooling fluid F1 at a relatively low pressure, including a forwardmost or intermediate stage, and the second stage 31B is a downstream stage of the high pressure compressor 52 at a relatively higher pressure than the first stage 31A, such as an intermediate or aftmost stage. In another embodiment, the first coolant source 35 supplies the cooling fluid F1 from the bypass flow path B at a relatively lower pressure and temperature than the second coolant source 37. In embodiments, the coolant source 35/37 is a stage 31 of the low pressure compressor 44 or another portion of the engine 20. In yet another embodiment, the coolant source 35/37 is a stage 33 of the turbine section 28, such as a first stage 33A and a second stage 33B of the turbine section 28. One of first and second stages 33A, 33B can be an upstream stage of the turbine section 28, such as a stage of the high pressure turbine 54, and another one of the first and second stages 33A, 33B can be a downstream stage of the turbine section 28, such as a stage of the low pressure turbine 46.

Figure 4:
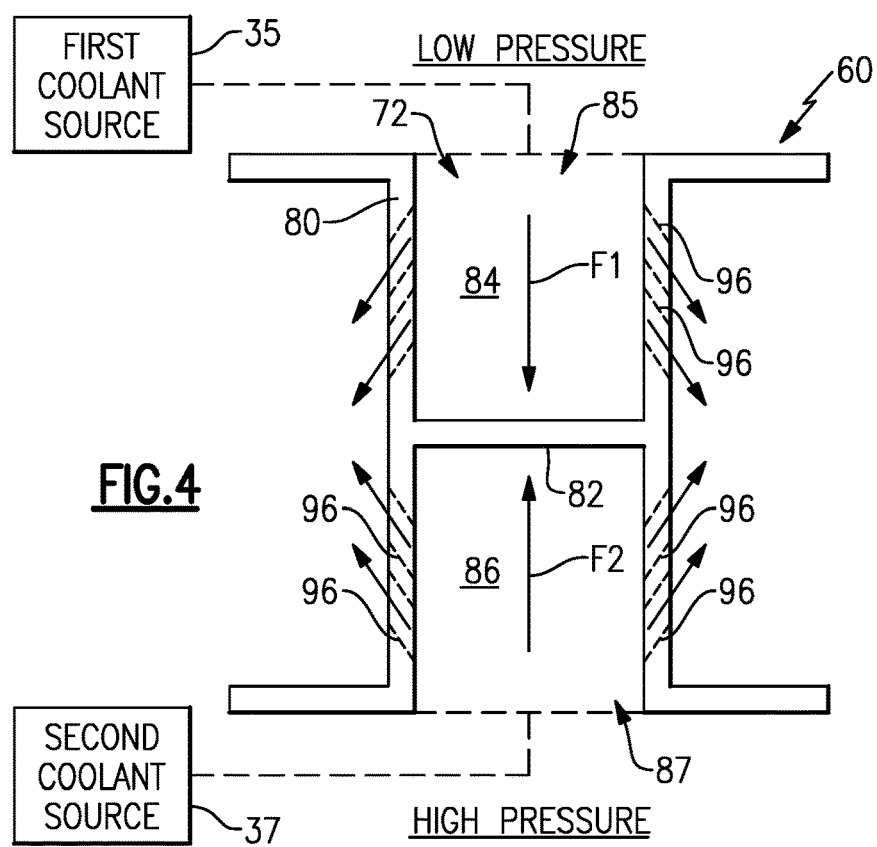
FIG. 4 illustrates a flow separating rib of a gas turbine engine component cooling circuit.

In the embodiment illustrated in FIG. 3, an inlet 85 of the first portion 84 of the cooling cavity 72 is positioned in a relatively high pressure area and an inlet 87 of the second portion 86 of the cooling cavity 72 is positioned at a relatively low pressure area. Of course, an opposite configuration is also possible in which the inlet 85 of the first portion 84 is located at a relatively low pressure area and the inlet 87 of the second portion 86 is within a relatively high pressure area (see FIG. 4). Despite the pressure differentials that may exist at the inlets 85, 87, flow of the first and second cooling fluids F1, F2 remains constant within both the first portion 84 and the second portion 86 because these portions are sealed from one another by the rib 82. Maintaining consistent flow in this manner results in relatively consistent Mach numbers, pressure losses, heat transfer and metal temperatures throughout the cooling cavity 72. In other words, the component 60 is more evenly cooled by virtue of the flow separating rib 82.

A plurality of openings 96 may extend through portions of the wall 80 associated with both the first portion 84 and the second portion 86 of the cooling cavity 72. The cooling fluids F1, F2 that are circulated in the first and second portions 84, 86, respectively, may be expelled through the openings 96. In one embodiment, the openings 96 are film cooling holes. In another embodiment, the openings 96 are slots. Any type of opening may extend through the wall 80 for expelling the cooling fluids F1, F2 from the cooling cavity 72.

Figure 5A:
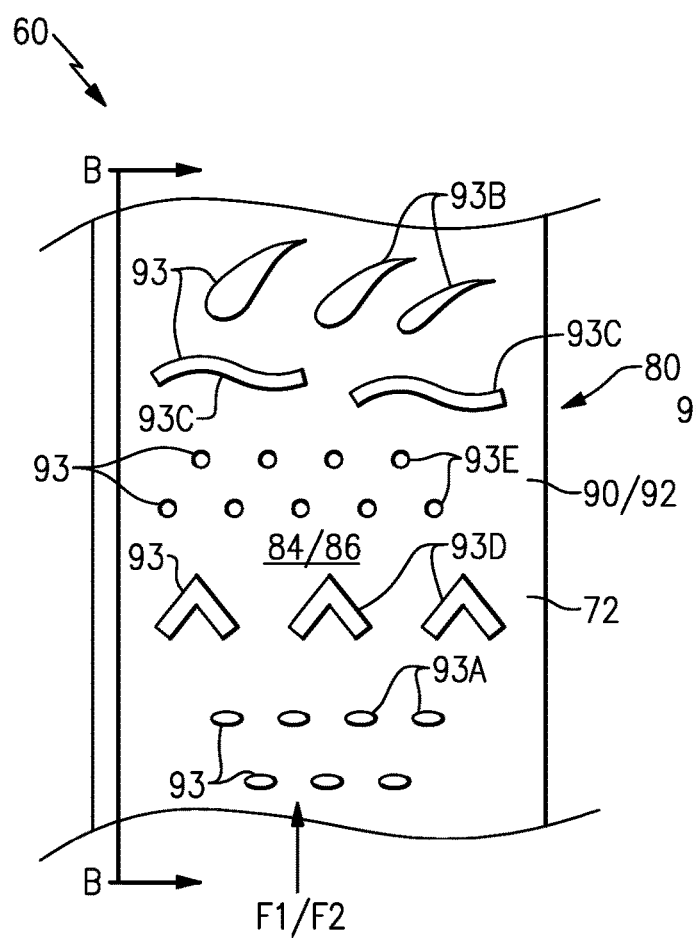
FIG. 5A illustrates cooling features of the component of FIG. 2.
Figure 5B:
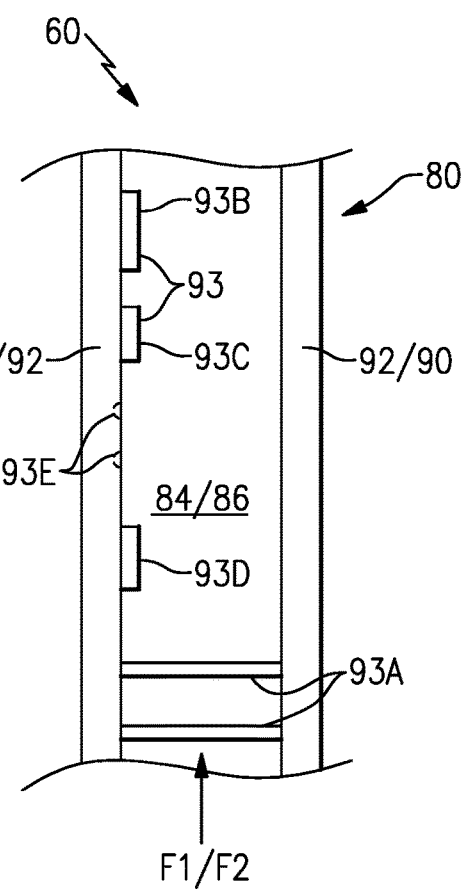
FIG. 5B illustrates a cross-sectional view through Section B-B of FIG. 5A.

Referring to FIGS. 5A and 5B, one or more cooling features 93 are defined along the wall 80. The cooling features 93 can extend from surfaces of the wall 80, such as one of sides 90, 92, and into the first and/or second portions 84, 86 of the cooling cavity 72. The cooling features 93 can be situated to provide additional surface area for convective cooling and/or direct or meter fluid flow within or through localized regions of the first and/or second portions 84, 86. Example cooling features 93 can include pedestals 93A extending between opposed surfaces of the cooling cavity 72, for example. Other cooling features 93 can include features having a curved or complex geometry such as teardrop shaped features 93B to direct flow through the cooling cavity 72, and sinusoidal shaped features 93C and trip strips 93D protruding from surfaces of the cooling cavity 72 to cause turbulence in the flow of cooling fluid F1/F2. Other example cooling features 93 can include recesses such as dimples 93E extending inwardly from surfaces of the wall 80.

Figure 6:
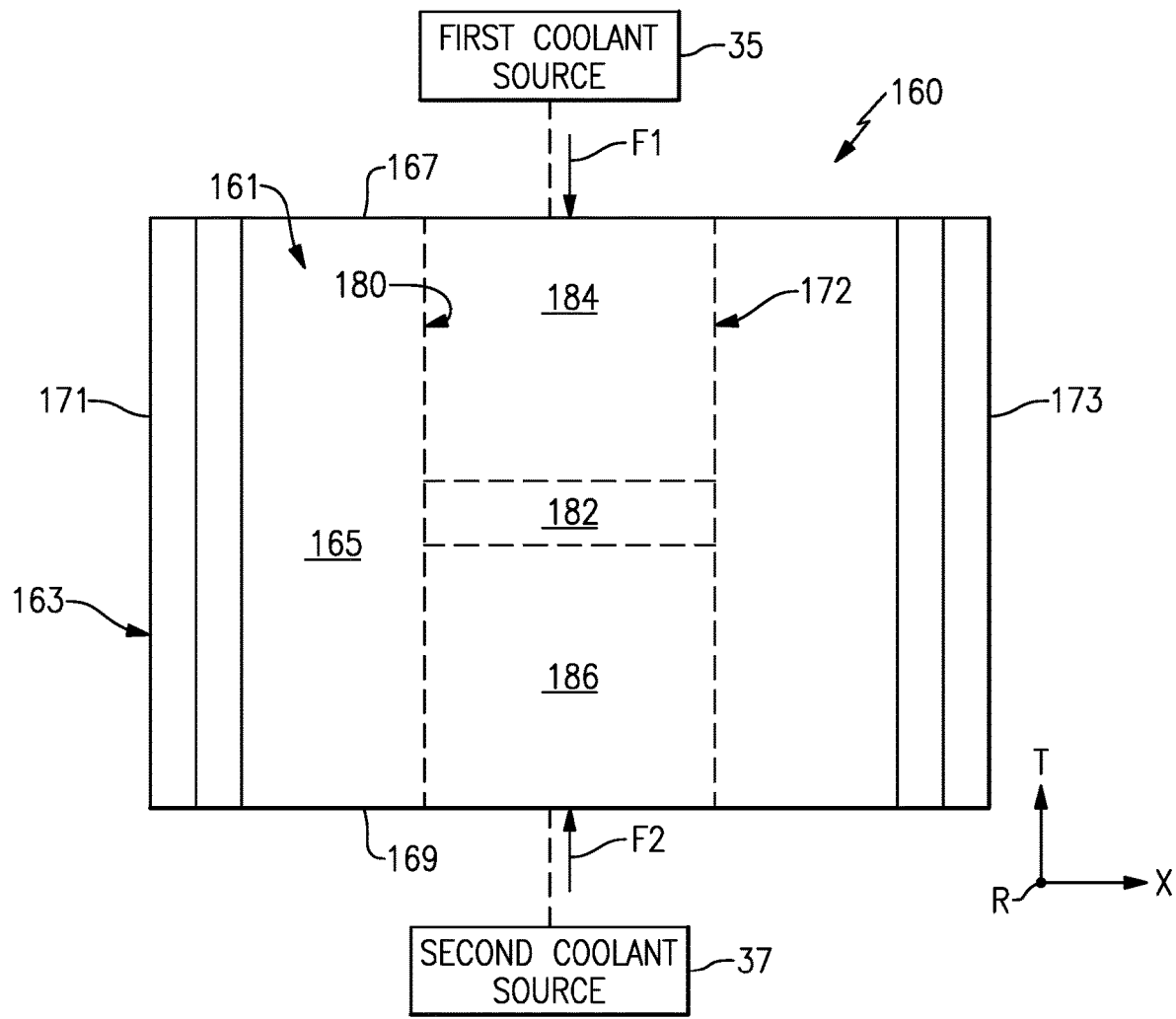
FIG. 6 illustrates a gas turbine engine component according to a second embodiment of this disclosure.
Figure 7:
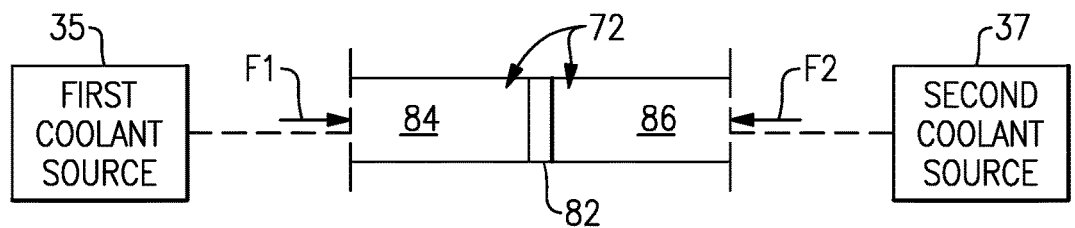
FIG. 7 illustrates another flow separating rib.

FIG. 6 illustrates another component 160 that can be incorporated into a gas turbine engine. In this disclosure, like reference numbers designate like elements where appropriate and reference numerals with the addition of 100 or multiples thereof designate modified elements that are understood to incorporate the same features and benefits of the corresponding original elements.

In this embodiment, the component 160 is represented as a BOAS. The BOAS can be situated adjacent to a tip of one the blades 25 and can be utilized to seal or otherwise bound the core flow path C (FIG. 1), for example. The component 160 includes a body 161 having a radially inner face 163 and a radially outer face 165. The radially inner face 163 and the radially outer face 165 extend circumferentially between a first mate face 167 and a second mate face 169 and extend axially between a leading edge 171 and a trailing edge 173.

A cooling cavity 172 may be disposed inside the body 161. The cooling cavity 172 of this embodiment circumferentially extends between the first mate face 167 and the second mate face 169. A wall 180 may extend about the cooling cavity 172. The cooling cavity 172 is divided into a first portion 184 and a second portion 186 by a rib 182. The rib 182 fluidly isolates the first portion 184 from the second portion 186.

The first portion 184 of the cooling cavity 172 may be fed with a first cooling fluid F1 at a location adjacent to the first mate face 167 and the second portion 186 may be fed with a second cooling fluid F2 at a location adjacent to the second mate face 169. The rib 182 is adapted to maintain these split flows at relatively constant flow levels despite potential pressure differentials that may exist between the first mate face 167 and the second mate face 169.

Figure 8:
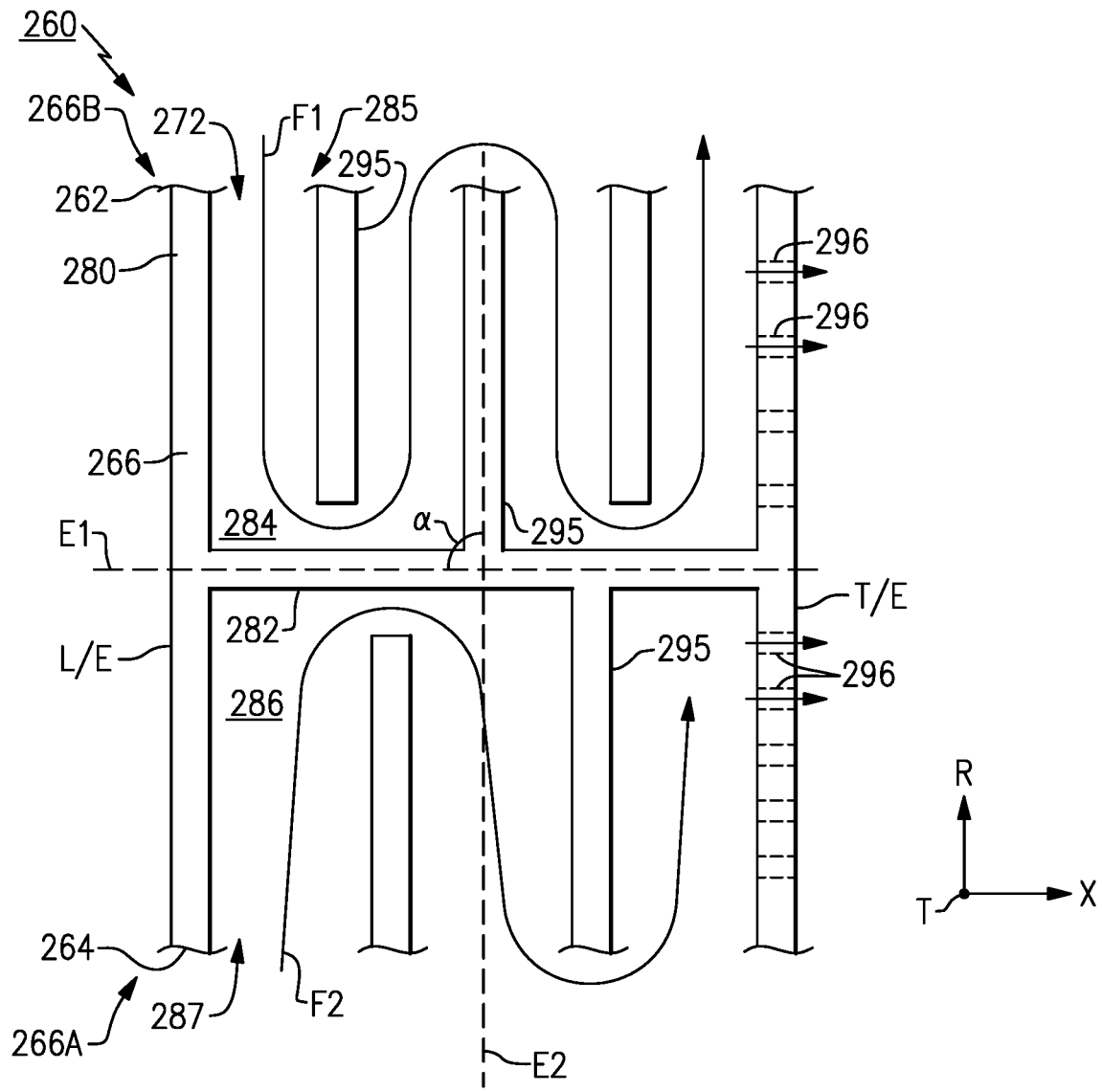
FIG. 8 illustrates a gas turbine engine component according to an embodiment of this disclosure.

FIG. 8 illustrates another component 260 that can be incorporated into a gas turbine engine. In the illustrated embodiment, the component includes an airfoil 266 that extends in a chordwise direction X between leading and trailing edges L/E, T/E. Rib 282 extends in the chordwise direction X between the leading and trailing edges L/E, T/E to fluidly isolate first and second portions 284, 286 such that the cooling fluids F1, F2 do not intermix in cooling cavity 272.

One or more radially extending ribs 295 extend from walls 280 to establish serpentine passages in first and second portions 284, 286. One or more of the ribs 295 can extend or be spaced apart from rib 282 to define sections of the respective serpentine passages, with rib 282 bounding each of the serpentine passages. In the illustrated embodiment of FIG. 8, rib 282 has a major component that extends in the chordwise direction X, and ribs 295 each have a major component that extends in a radial direction R.

An axis E1 of rib 82 can be oriented relative to an axis E2 that extends in the radially direction R through the airfoil 266 to establish a radial angle α. In embodiments, the axis E1 is substantially perpendicular to the axis E2. In other embodiments, the angle α is non-perpendicular such that the axis E1 has a component that extends in the radial direction R and the axis E1 is skewed toward an inner diameter 266A or an outer diameter 266B of the airfoil 266. The axis E1 can be skewed to adjust a pressure of the cooling fluid F1, F2 that is discharged by opening(s) 296. In embodiments, the radial angle α is between 10-30° or between 70-90°.

Figure 9:
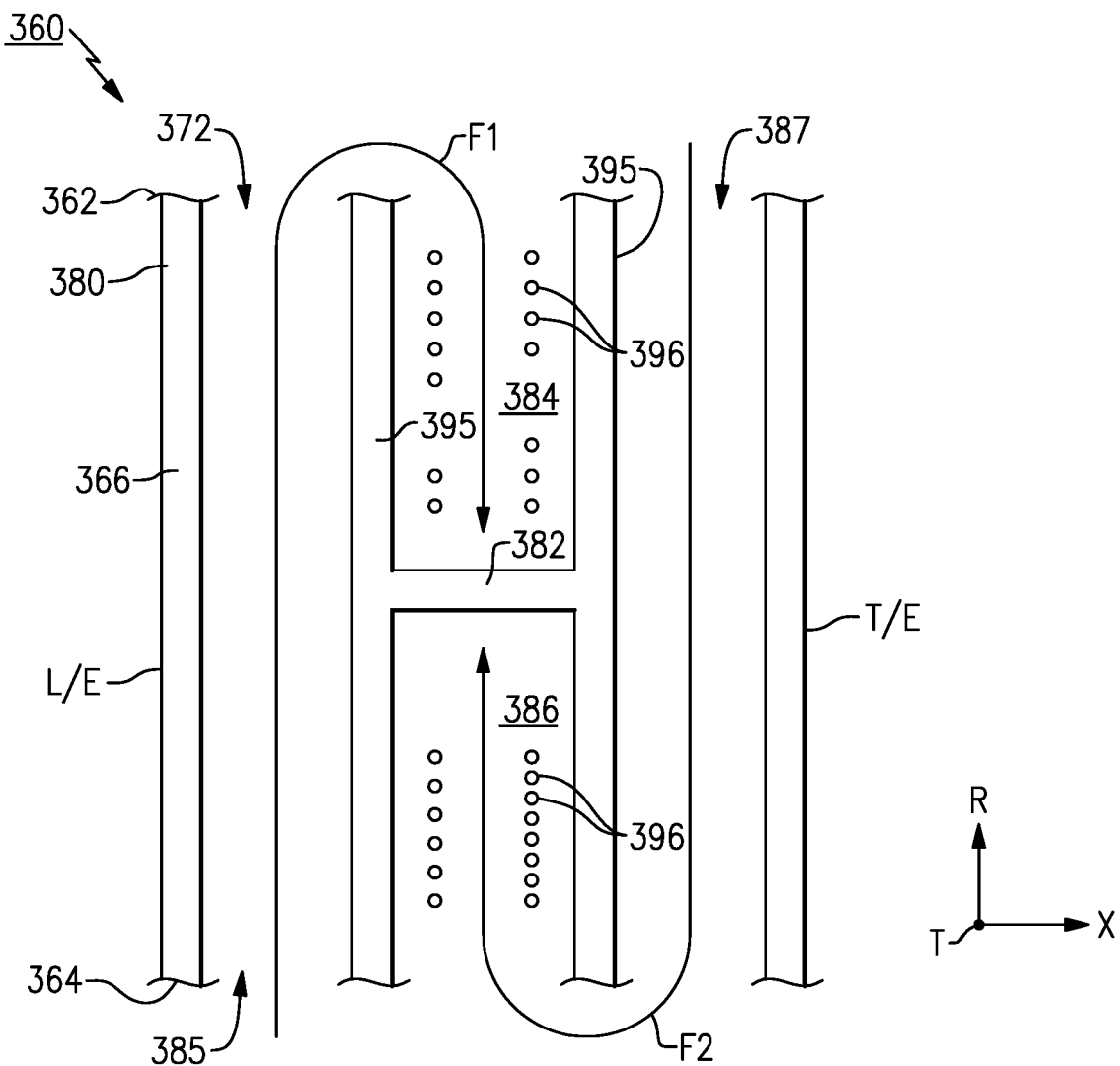
FIG. 9 illustrates a gas turbine engine component according to another embodiment of this disclosure.

FIG. 9 illustrates yet another component 360 that can be incorporated into a gas turbine engine. In the illustrated embodiment, the component includes an airfoil 366 including a rib 382 that fluidly isolates first and second portions 384, 386 of cooling cavity 372. Rib 382 spans between ribs 395 and is spaced apart from leading and trailing edges L/E, T/E. Flow of cooling fluids F1, F2 can be directed from inlets 385, 387 and towards the rib 382. Wall 380 can include one or more openings 396 to expel the cooling fluids F1, F2 from the first and second portions 384, 386 of the internal cavity 372 to provide film cooling, for example.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component for a gas turbine engine, comprising:
a wall that extends about a cooling cavity, wherein said cooling cavity is a dual-fed cavity that is fed from at least two different locations; and
a rib that separates said cooling cavity into a first portion and a second portion that is fluidly isolated from said first portion;
wherein the component is an airfoil;
wherein said first portion is fed with a first cooling fluid from a first coolant source, and said second portion is fed with a second, different cooling fluid from a second coolant source, the first and second coolant sources being separate and distinct from the component;
wherein said first and second coolant sources are different stages of a compressor section or a turbine section;
wherein said first portion is an outer diameter portion and said second portion is an inner diameter portion of said cooling cavity; and
wherein said outer diameter portion defines a first serpentine passage and said inner diameter portion defines a second serpentine passage, the first and second serpentine passages bounded by said rib.

2. The component as recited in claim 1, wherein said wall circumscribes said cooling cavity.

3. The component as recited in claim 1, wherein said rib is offset from a midspan of said airfoil.

4. The component as recited in claim 3, wherein said rib is defined at a location between 10% and 90% span or between 30% and 70% span of said airfoil.

5. The component as recited in claim 1, further comprising a plurality of cooling features defined along said wall.

6. The component as recited in claim 5, wherein said plurality of cooling features include pedestals that extend between opposed surfaces of said cooling cavity.

7. The component as recited in claim 5, wherein said plurality of cooling features include trip strips that protrude from surfaces of said cooling cavity.

8. The component as recited in claim 1, wherein said rib is skewed in a radial direction towards one of an inner diameter and an outer diameter of said airfoil.

9. The component as recited in claim 1, wherein said rib extends between leading and trailing edges of said airfoil.

10. The component as recited in claim 1, wherein said rib connects between opposing sides of said wall.

11. The component as recited in claim 1, wherein said rib extends in an axial direction inside of said cooling cavity.

12. The component as recited in claim 1, comprising a plurality of openings through portions of said wall associated with both said first portion and said second portion, wherein said plurality of openings are film cooling holes.

13. A gas turbine engine, comprising:
a compressor section;
a turbine section; and
a component that defines a cooling circuit that cools said component with a cooling fluid, said cooling circuit is disposed inside an airfoil of said component, said cooling circuit including:
a cooling cavity disposed inside of said component; and
an axial rib that divides said cooling cavity into a first portion and a second portion that is separate from said first portion;
wherein said first portion is fed with a first cooling fluid from a first coolant source, and said second portion is fed with a second, different cooling fluid from a second coolant source, the first and second coolant sources being separate and distinct from the component;
wherein said first and second coolant sources are different stages of said compressor section or said turbine section;
wherein said first portion is an outer diameter portion and said second portion is an inner diameter portion of said cooling cavity; and
wherein said outer diameter portion defines a first serpentine passage and said inner diameter portion defines a second serpentine passage, the first and second serpentine passages bounded by said rib.

14. The gas turbine engine as recited in claim 13, wherein said rib fluidly isolates said first portion from said second portion.

15. The gas turbine engine as recited in claim 13, further comprising a mid-turbine frame that includes said airfoil.

16. A component for a gas turbine engine comprising:
a wall that extends about a cooling cavity, wherein said cooling cavity is a dual-fed cavity that is fed from at least two different locations; and
a rib that separates said cooling cavity into a first portion and a second portion that is fluidly isolated from said first portion;
wherein the component is an airfoil;
wherein said first portion is fed with a first cooling fluid from a first coolant source, and said second portion is fed with a second, different cooling fluid from a second coolant source, the first and second coolant sources being separate and distinct from the component;
wherein said first portion is an outer diameter portion and said second portion is an inner diameter portion of said cooling cavity;
wherein said outer diameter portion defines a first serpentine passage and said inner diameter portion defines a second serpentine passage, the first and second serpentine passages bounded by said rib; and
wherein said rib is spaced apart from leading and trailing edges of said airfoil.

17. The component as recited in claim 16, wherein said rib extends in an axial direction inside of said cooling cavity.

18. The component as recited in claim 16, wherein said wall circumscribes said cooling cavity.

19. The component as recited in claim 16, comprising a plurality of openings through portions of said wall associated with both said first portion and said second portion, wherein said plurality of openings are film cooling holes.

20. A component for a gas turbine engine comprising:
a wall that extends about a cooling cavity, wherein said cooling cavity is a duel-fed cavity that is fed from at least two different locations; and
a rib that separates said cooling cavity into a first portion and a second portion that is fluidly isolated from said first portion;
wherein the component is an airfoil;
wherein said first portion is fed with a first cooling fluid from a first coolant source, and said second portion is fed with a second, different cooling fluid from a second coolant source, the first and second coolant sources being separate and distinct from the component;
wherein said first and second coolant sources are different stages of a compressor section or a turbine section; and
wherein said first portion is circumferentially offset from said second portion.

* * * * *